O. E. PARIS.
MILK BOTTLE HOLDER.
APPLICATION FILED AUG. 11, 1915.
1,208,633.
Patented Dec. 12, 1916.
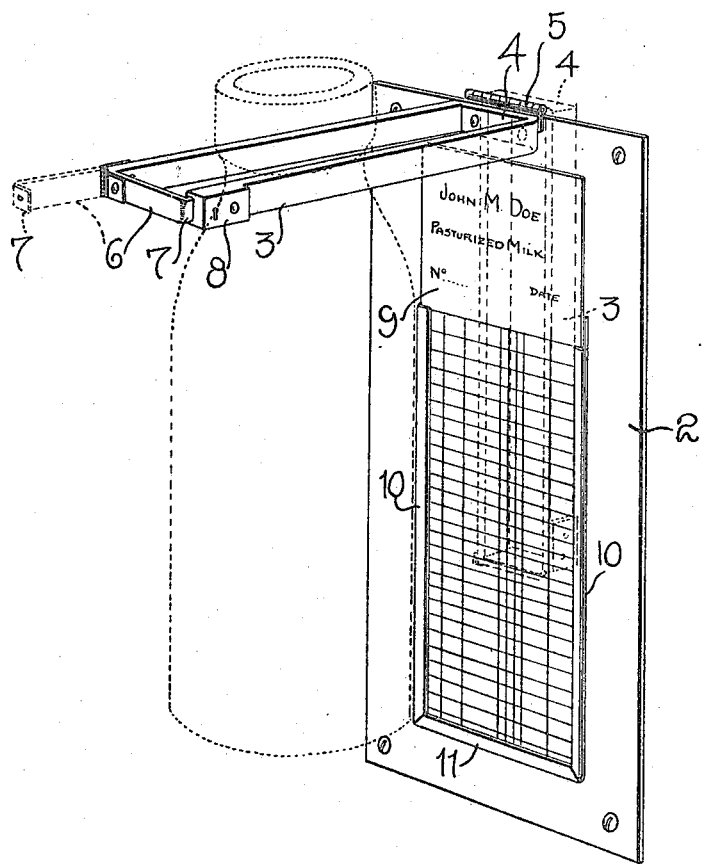
Inventor
O. E. PARIS
By Watson E. Coleman
Attorney

UNITED STATES PATENT OFFICE.

OTTES E. PARIS, OF AURORA, ILLINOIS, ASSIGNOR OF ONE-HALF TO GEORGE M. PARIS, OF MONTGOMERY, ILLINOIS.

MILK-BOTTLE HOLDER.

1,208,633.              Specification of Letters Patent.      Patented Dec. 12, 1916.

Application filed August 11, 1915. Serial No. 44,982.

*To all whom it may concern:*

Be it known that I, OTTES E. PARIS, a citizen of the United States, residing at Aurora, in the county of Kane and State of Illinois, have invented certain new and useful Improvements in Milk-Bottle Holders, of which the following is a specification, reference being had to the accompanying drawings.

This invention relates to devices for holding and locking bottles and particularly to a locking rack for supporting and locking milk bottles in position, to thereby prevent the milk bottles from being stolen.

The primary object of my invention is the provision of a very simple milk bottle lock disposed in conjunction with a supporting plate, this plate being arranged to carry an account card showing the milk account of the family using the holder.

A further object of the invention is the provision of a holding device and a supporting member so arranged that the holding rack is disposed at right angles to the supporting member which forms a base attachable to any suitable support, the rack, however, being adapted to be turned over upon the back of the supporting member so that the device may be put into compact form for transportation.

A further object of the invention is the provision of a milk bottle supporting and locking rack so constructed that it may be disposed above the floor of a porch or above the ground and thereby support milk bottles in such position that animals cannot remove the caps of the bottles and get at the milk contained therein.

Other objects will appear in the course of the following description.

The invention is illustrated in the accompanying drawing, wherein the figure is a perspective view of a milk bottle holder showing in dotted lines the rack turned back upon the base.

Referring to these drawings, 2 designates a base plate which may be made of tin or stiff sheet metal and which is adapted to be fastened by screws, bolts or other fastening devices to the base of a porch or to the side of a house or in any other convenient position. Hinged to the upper end of the base plate 2, is a bottle rack comprising a substantially U-shaped strip of metal designated 3, the cross bar 4 of the rack being hinged to the base plate 2 by means of the hinge 5. The rack is riveted or otherwise attached to one leaf of the hinge and the other leaf is riveted or otherwise attached to the base plate 2. Hinged to the extremity of one leg of the U-shaped rack is a cross bar 6, whose free end is angularly bent, as at 7 and when closed, extends into a lock casing 8, which is riveted or otherwise attached to the other leg of the rack. This lock casing is provided with any suitable locking mechanism adapted to lock the lock bar 6 in its closed position and is intended to be locked by a key. One key being in the possession of the milk man and the other in the possession of the family using the device. The arms of the rack are spaced apart a distance which is equal to the diameter of the neck of a milk bottle so that the upper flange of the milk bottle will be disposed over the top of the rack and the shoulder of the milk bottle will be disposed below the arms of the rack so that when the bottles are in position within the rack, it is impossible to withdraw the bottles except by unlocking the end cross bar 6. As illustrated the rack is designed to hold two quart bottles, this being more than the average amount of milk used in a private family. The rack, however, may be formed to support pint bottles or may also be formed so as to support both milk bottles and small cream bottles.

For the purpose of supporting an account card 9 upon the base 2, I form the base with the inwardly turned guide flanges 10 and with the upwardly turned flange 11, forming a stop for the card 9. The card may be slid into place upon the top and is held in its normal position by the rack 3. When it is desired to remove the card, the rack is turned upward, whereupon the card may be readily detached.

The advantages of my device are obvious. Statistics show that 1,500,000 milk bottles are lost every year and furthermore milk, when left upon a front porch or in any like exposed situation, is very often stolen. Furthermore, the milk bottles when so left, are usually set upon the porch and as a consequence, animals may very readily detach the caps of the milk bottles and get at the milk or turn the bottles over. This necessitates the milk being left usually upon a rear porch, which to some extent protects it from theft but in this case, the milk man has to lose considerable time by going around to the rear of the house. With my device, the empties are placed within the rack the night before and the milk man finds them there when he comes to deliver the milk. He removes the empties and inserts the fresh bottles and locks the rack. The milk bottles can not be removed from the rack without the use of the proper key and, as a consequence, no milk is stolen. Inasmuch as the device is mounted upon the railing or fence of the porch or the side of the house, animals cannot get access to the bottles and they remain uncontaminated and with the contents untouched. The invention is simple, can be very cheaply made and the device weighs less than two pounds so it may be very readily transported and put in place.

Having described my invention, what I claim is:—

1. A milk bottle holder comprising a base plate, a substantially U-shaped bottle rack comprising oppositely disposed parallel arms and an integral connecting strip, a hinge attaching the upper edge of the connecting strip to the upper edge of the base, said hinge permitting the rack to move from a position against the back of the base plate and parallel thereto into a position at right angles to the base plate and engaging at its butt end with the face of the plate to support the rack perpendicularly to the face of the plate, and a locking member hinged to the outer end of one arm of the bottle rack and having locking engagement with the outer end of the other arm of the rack and when locked preventing bending of the two arms into divergent relation.

2. A milk bottle holder and protector comprising a base, a bottle rack hinged to the upper end of the base and adapted to be drawn either into an angular position with reference to the base, or turned upward approximately parallel thereto, and an account card removably mounted upon the base and normally prevented from removal by the bottle rack when the latter is in a position at right angles to the base.

In testimony whereof I hereunto affix my signature in the presence of two witnesses.

OTTES E. PARIS.

Witnesses:
C. C. SMITH,
ANNA A. FOWLER.

Copies of this patent may be obtained for five cents each, by addressing the "Commissioner of Patents, Washington, D. C."